Sept. 16, 1924.
H. KOLLMANN
ACCUMULATIVE BRAKE
Filed June 21, 1924
1,508,558
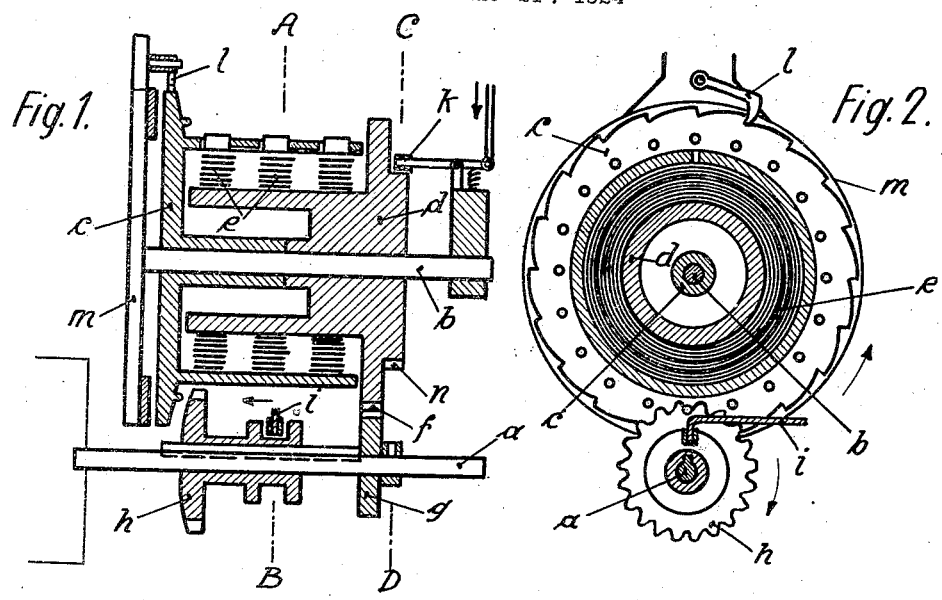
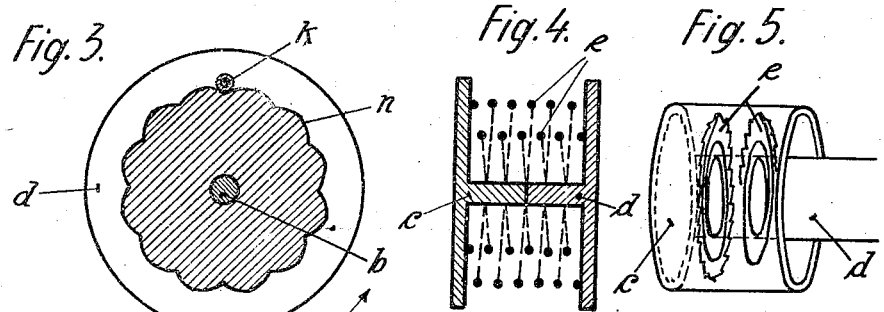
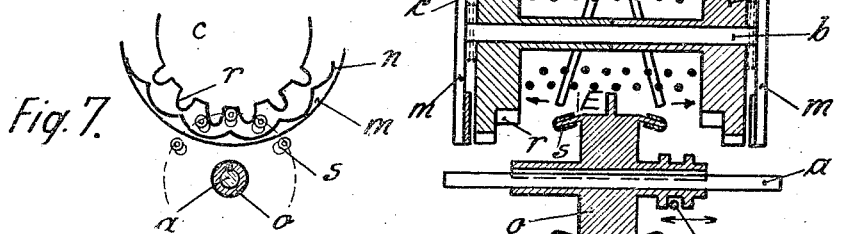
Witnesses:
Inventor: Hermann Kollmann Patented Sept. 16, 1924.

1,508,558

UNITED STATES PATENT OFFICE.

HERMANN KOLLMANN, OF ROSENHEIM, GERMANY.

ACCUMULATIVE BRAKE.

Application filed June 21, 1924. Serial No. 721,527.

*To all whom it may concern:*

Be it known that I, HERMANN KOLLMANN, a German citizen, and residing at Rosenheim, Oberbayern, Germany, have invented certain new and useful Improvements in an Accumulative Brake (for which I have made application for patent in Germany on March 9th, 1923, No. 394,620), of which the following is a specification.

Accumulative brakes so constructed that the energy is transmitted to springs which collect the same and re-transmit it by means of appropriate contrivances, are already known. However, said known constructions, in which either power consuming bevel wheel pairs or intermediary gearings are employed or the power collector itself must be displaced with reference to the wheel axle, are more or less complicated.

The present invention provides an improved accumulative brake, by which said drawbacks are avoided and which can also be used as a friction brake by one and the same manipulation and in which the power collector when overstrained is automatically partly unloaded, the friction faces being thereby much less strained than in ordinary friction brakes.

The essence of the invention consists in causing the device embodying the invention to act as a brake when desired to check the momentum of the vehicle to which it is attached by causing a rotating member of the vehicle to wind up a spring contained in said device, and then when desired causing said spring to assist in the movement of the vehicle.

The accompanying drawing illustrates the improved arrangement:

Fig. 1 is a longitudinal section through a brake for vehicles having one direction of movement, Figs. 2 and 3 are cross-sections on the lines A—B and C—D of Fig. 1 respectively;

Figs. 4 and 5 show two modifications of the power collector particularly adapted for vehicles having a double direction of movement, Fig. 6 is a longitudinal section through a brake for such vehicles, and Fig. 7 is a cross-section on the line E—F of Fig. 6.

Beyond the wheel axle $a$ a shaft $b$ is located and fitted with two axially movable separate rotation bodies $c$ and $d$ of which the adjacent surfaces are connected by a plurality of separate spiral springs $e$, said rotation bodies having the same turning direction with reference to said wheel axle. One of said rotation bodies, $d$, has a toothing $f$ in gear with a pinion $g$ on the wheel axle. Said pinion is in a way known in the art so mounted on the wheel axle that a coupling therewith takes place when member $d$ rotates the pinion $g$, while at a standstill of said pinion the axle freely turns therein. The wheel axle $a$ carries further a gear wheel $h$ which is permanently coupled therewith but movable thereon in axial direction. Said gear wheel $h$ forms part of a clutch between said axle and the second rotation body $c$ adapted to be operated by means of a braking lever $i$. The rotation body $d$ is normally locked, that is prevented from rotating, by a spring-pressed locking lever $k$, while the rotation body $c$ is secured against retrograde movement by a locking pawl $l$ in gear with its ratchet circumference. The shaft $b$ carries further a fixed friction disc $m$ which can be coupled with the rotation body $c$ by means of the braking lever $i$ and wheel $h$.

The operation of the improved brake, for vehicles having one direction of movement, is as follows:

By a slight actuation of the braking lever $i$ the wheel axle $a$ is coupled with the rotation body $c$, which is thereby rotated while the locking pawl $l$ freely slips over its ratchet circumference. The second rotation body $d$ is meanwhile locked by the spring-pressed locking lever $k$. Consequently, the springs $e$ are tensioned and thereby the wheel axle $a$ is braked. By reversing the braking lever $i$ and thus putting the clutch members $h$, $c$ out of gear, the rotation body $c$ is prevented from returning by means of the locking pawl $l$ so that the tension of the springs $e$ is maintained. A re-transmission of the energy thus collected to the wheel axle is effected simply by lifting the locking lever $k$.

If a sudden strong braking is required, the braking lever $i$ is actuated until the rotation body $c$ is coupled with the friction disc $m$.

To prevent overstraining of the springs $e$, care must be taken that at an excess tensioning of the latter the locking lever $k$ is automatically disengaged. For this purpose, for instance, the locking circumference $n$ of the rotation body $d$ may be rosetteshaped as shown in Fig. 3, whereby the locking lever *k* is automatically disengaged by slipping from one depression into the other if the tension of the springs becomes too great.

If an uninterrupted breaking action is desired, the gear wheel *h* may be kept in mesh with member *c* while the lever *k* at the same time is kept disengaged from the surface *n*.

The locking lever *k* is preferably fitted with an anti-friction roller, and similar anti-friction provisions may be made at the clutch *h*, *c* where desired.

Modifications of the power collector, which are particularly adapted for vehicles with a double direction of movement, are shown in Figs. 4 and 5.

In Fig. 4, the springs *e* form longitudinal coils the ends of which are attached to opposite inner faces of the rotation bodies *c* and *d*. To prevent an axial displacement of the latter due to the spring tension, the springs are helically coiled in different directions (to the right and to the left) while furthermore springs of different tension may be employed. In the construction shown diagrammatically in Fig. 5, the differently coiled springs (helices) engage with their ends in corresponding ratchets at the inner face of one rotation body in such a way that, corresponding to the different coiling direction of the springs, a coupling with the rotation body is effected by part of the springs only while the other part (half) of the springs travels with its ends freely over the corresponding ratchets.

A construction of a brake for vehicles having a double direction of movement is represented in Figs. 6 and 7. Pinion and braking wheel are here combined to form one integral member *o* which is axially movable on the wheel axle *a* and which may be used for an alternative coupling with reference to the two rotation bodies *c* and *d*. Either of the two rotation bodies *c*, *d* may in this example serve for a reception as well as for a delivery of energy. The coupling member *o* carries a projecting middle ring *p* which, upon said body approaching one of the rotation bodies and effecting coupling, causes an automatic disengagement of the corresponding spring-pressed locking lever *k*.

A coupling rim *r* is arranged at the inner face of each rotation body and is preferably constructed as shown in Fig. 7. Friction discs *m* are arranged at each end of the brake. The oblique direction of the coupling pins *s* is to permit a smooth gearing.

Of course, the construction last-described can also be used for vehicles having one direction of movement only. When reversing the direction of movement, the braking energy contained in the power collector is utilized by using the rotation body previously coupled for braking, for a delivery of energy.

In railway vehicles, an axial movement of the body *o* may be attained by a corresponding pressure control in the Westinghouse brake.

In vehicles having a strongly spring-supported frame, the axle *a* and shaft *b* may be arranged at the same level.

What I claim, is:—

1. In an accumulative brake structure: the combination with a wheel axle, of a power collector including a spring motor located adjacent to said axle, means for connecting said motor to said axle, a friction disc, a braking lever having means to couple said wheel axle selectively with said power collector or with said disc and said collector, and a locking lever for engaging said power collector adapted to yield when said motor is overstrained, substantially as set forth.

2. A brake structure as specified in claim 1, in which said motor comprises the combination of a shaft located beyond said wheel axle, two axially movable separate rotation bodies on said shaft having the same turning direction with reference to said wheel axle, a plurality of separate spiral springs connected to the adjacent surfaces of said rotation bodies; and in which the locking lever forms part of means to separately lock said bodies at their circumferences, substantially as set forth.

3. The combination of a vehicle axle, a coupling member carried by said axle and axially slidable therealong, a lever engaging said member, a pair of discs, and a power collector arranged between said discs and in parallelism with said axle and comprising a pair of independently movable rotation bodies, springs interposed between said bodies and a pair of locking levers each yieldingly engaging the adjacent one of said rotation bodies, the first mentioned lever adapted to shift said coupling member into engagement with either of said rotation bodies and raise the locking lever engaging the same, or to shift said coupling member to move either rotation body against the adjacent disc, substantially as and for the purpose set forth.

In testimony whereof I have hereunto set my hand in the presence of two subscribing witnesses.

HERMANN KOLLMANN.